United States Patent [19]

Mizoguchi

[11] Patent Number: 5,550,607
[45] Date of Patent: Aug. 27, 1996

[54] LENS-FITTED PHOTOGRAPHIC FILM UNIT WITH ELECTRONIC FLASH EQUIPMENT

[75] Inventor: Shuri Mizoguchi, Hino, Japan

[73] Assignee: Konica Corporation, Japan

[21] Appl. No.: 333,147

[22] Filed: Nov. 1, 1994

[30] Foreign Application Priority Data

Nov. 25, 1993 [JP] Japan .................................. 5-295561

[51] Int. Cl.⁶ ................................................ G03B 15/03
[52] U.S. Cl. ...................................................... 354/149.11
[58] Field of Search ............................. 354/149.11, 266, 354/147, 129

[56] References Cited

U.S. PATENT DOCUMENTS

5,436,685  7/1995  Yamashina ......................... 354/149.11

Primary Examiner—David M. Gray
Attorney, Agent, or Firm—Jordan B. Bierman; Bierman and Muserlian

[57] ABSTRACT

A lens-fitted photographic film unit in which an unexposed photographic film has been loaded in advance, has a main body to which the unexposed film and an electronic flash unit including an electronic flash circuit is attachable. The film unit further includes a sector provided on the main body, for exposing the film by an opening and closing movements of the sector responsive to a release operation, and a connecting unit having a first and a second electrically conductive members disposed to face and to be in spaced relation with each other. Each of the members includes a first tip end and a second tip end opposite to the first tip end. Each of the first tip ends is electrically in contact with the electronic flash circuit when the unit is attached to the main body. Further, when the operation is conducted, the second tip end of the first member is forced to move in accordance with an opening movement of the sector to come in contact with the second tip end of the second member.

2 Claims, 7 Drawing Sheets

LENS-FITTED PHOTOGRAPHIC FILM UNIT WITH ELECTRONIC FLASH EQUIPMENT

BACKGROUND OF THE INVENTION

The present invention relates to a lens-fitted photographic film unit including a electronic flash unit by which a previously charged unexposed film can be immediately subjected to flash photography, and more particularly relates to a lens-fitted photographic film unit including a electronic flash unit having a a printed board on which a electronic flash circuit is formed and also having a electronic flash trigger switch capable of being used as a sector spring for a sector to expose the film for a period of time.

In this specification, the lens-fitted photographic film unit is defined as a camera integrally provided with a photographic film, and this camera is used only when the previously charged photographic film is exposed for photography, and the camera body is recycled after the charged photographic film has been exposed and taken out from the camera.

Figure 9:
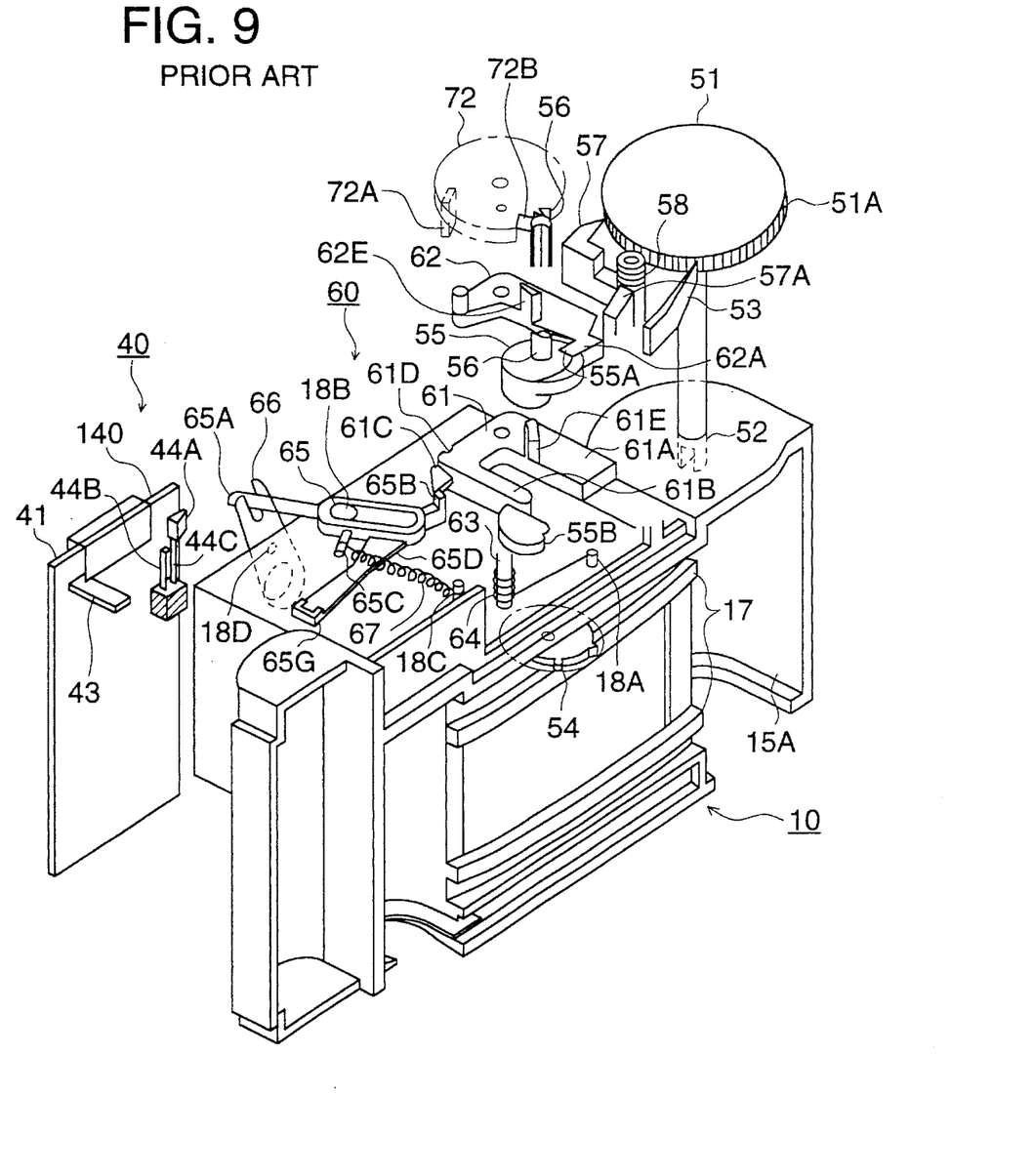
FIG. 9 is a perspective view of the conventional film unit, wherein the view is taken from the back.

FIG. 9 is a perspective view showing an external appearance of a conventional lens-fitted photographic film unit, wherein the view is taken from the back of the lens-fitted photographic film unit.

Operations of the conventional film unit from the sector charge to the film exposure will be explained below.

When a sector 66 pivotally supported by a sector pin 18D implanted in the film unit body 10 is operated, a sector lever 65 conducts an exposing operation so that an image formed by a photographic lens (not shown) is exposed on a photographic film.

A sector drive pin 65A is implanted in the sector lever 65 and inserted into a forked portion of the sector 66. A pin 18B is inserted into a long hole of the sector lever 65, so that the sector lever 65 can be slidably guided by the pin 18B. When a sector spring 67 is provided between an engaging member 65C implanted in the sector lever 65 and a pin 18C implanted in the film unit body 10, the sector lever 65 is pushed in a direction in such a manner that the left side of the long hole of the sector lever 65 comes into contact with the pin 18B. The sector lever 65 is provided with a rising portion 65B and an arm plate 65D. In this case, the arm plate 5D is pushed by the sector spring 67 in a direction in such a manner that the arm plate 65D comes into contact with the pin 8C implanted in the film unit body 10. The sector lever 65 is vertically regulated by a holding plate (not shown) provided in a sector case (not shown) attached to the film unit body 10, so that the sector lever 65 is not disengaged from the pin 18B.

A triangular kick member 61C is provided at the middle of an arm portion 61B of the charge lever 61. When the charge lever 61 is rotated clockwise, the rising portion 65B of the sector lever 65 pushes the kick member 61C. Due to the foregoing, the sector lever 65 is moved onto the sector 66 side while the long hole of the sector lever 65 is guided by the pin 18B, resisting a tension force of the spring 67. When the sector lever 65 is moved as described above, the sector drive pin 65A of the sector lever 65 is moved in the forked portion of the sector 66 without moving the sector 66 from its closing position. When the charge lever 61 is rotated clockwise, the kick member 61C of the charge lever 61 is disengaged from the rising portion 65B of the sector lever 65. Then the sector lever 65 is returned by a spring force to a position at which the left end of the long hole of the sector lever 65 comes into contact with the pin 18B, and the arm plate 65D of the sector lever 65 comes into contact with the pin 18C. In this condition, the sector charge mechanism 60 completes the charging operation.

As described above, not only the sector spring 67 returns the sector lever 65 but also the sector spring 67 always rotates the sector lever 65 around the pin 18B counterclockwise. By the counterclockwise rotating motion of the sector lever 65, the time of exposure conducted by the sector 66 is determined in relation to a charge lever spring 64 which is stronger than the sector spring 67. Even when the sector lever 65 is moved while the long hole is guided by the pin 18B, the sector drive pin 65A of the sector lever 65 always holds the sector 66 in a closed condition.

The electronic flash unit 40 is constructed in the following manner:

The electronic flash circuit is provided on a printed board 41, and a electronic flash light emitting unit 140 and a contact point unit 44C having a pair of synchronizing contacts 44A, 44B are integrally provided on the printed board 41. After the electronic flash unit 40 has been attached to the film unit body 10, it is electrically connected so that electronic flash light emitting control can be conducted.

Exposure conducted on a film will be explained as follows.

When a release button (not shown) on a front cover (not shown) is pressed, the operation is conducted as follows:

A winding stopper 57 is pushed in a direction of an arrow put on a winding knob 51. The winding stopper 57 is rotated counterclockwise resisting a spring force of a winding stopper spring 58. An edge of an arm portion 61A of the charge lever 61 is disengaged from an end surface of an arm portion 57A of the winding stopper 57. Therefore, a cam stopper 62 is rotated counterclockwise by a spring force of the charge lever spring 64.

When the charge lever 61 is rotated counterclockwise by a spring force of the charge lever spring 64 which is stronger than the sector spring 67, the triangular kick member 61C attached to the charge lever 61 hits the rising portion 65B of the sector lever 65, so that the rising portion 65B is disengaged from the kick member 61C. Due to the foregoing, the sector lever 65 is rotated clockwise around the pin 18B in the long hole, resisting a tension generated by the sector spring 67. Accordingly, a pushing portion 65G provided at a fore end of the arm plate 65D of the sector lever 65 pushes a electronic flash trigger switch 44A. Due to the foregoing motion, the synchronizing contacts 44B and 44C are contacted with each other. When the synchronizing contacts 44B and 44C are contacted in the manner described above, electric power is supplied from a condenser (not shown) to the electronic flash light emitting section, so that electronic flash light is emitted. During the electronic flash light is emitted, the sector 66 rotates to expose the photographic film. Successively, the sector lever 65 is returned to its initial position by a tension of the sector spring 67. Consequently, the sector drive pin 65A rotates the sector 66 around the sector pin 18D so as to expose the photographic film, and then the sector 66 is closed.

As described above, the sector spring 67 composed of a coil spring acts on the sector 66 to hold a light-tightly closed position before shutter release operation, and acts on the sector 66 to return to its initial light-tightly closed position after shutter release operation and its consequent swing motion. When the sector spring 67 is provided between the sector lever 65 and the film unit body 10, or between the sector 66 and the film unit body 10, a difference is caused in the swing speed of the sector 66 by the existence of a printed board described later, so that an error is caused in the shutter speed. The reason why the error is caused is that the electronic flash trigger switch 44A becomes a load for the sector spring 67. In order to solve the above problems, there are provided two types of sector springs 67 in which the pushing forces are different. One is a sector spring suitable for a device in which a printed board for electronic flash use is provided, and the other is a sector spring suitable for a device in which a printed board for electronic flash use is not provided. When the above sector springs having different pushing forces are appropriately used, the occurrence of an error of the shutter speed is prevented.

According to the above construction, the number of parts is large. Further, at least two types of coil springs must be prepared, and one of them must be appropriately selected for assembly. Therefore, the assembly process becomes complicated.

SUMMARY OF THE INVENTION

The first object of the present invention is to provide a lens-fitted photographic film unit to which the approximately constant shutter speed can be applied irrespective of the existence of a printed board for electronic flash use.

The second object of the present invention is to provide a electronic flash trigger switch capable of being used as a sector spring.

The third object of the present invention is to provide a printed board on which a electronic flash circuit is formed, wherein the printed board is capable of being attached to and detached from the electronic flash trigger switch.

The first object of the present invention can be accomplished by a lens-fitted photographic film unit, the sector spring for returning and holding the sector of which is composed of a leaf spring.

The first object of the present invention can be also accomplished by a lens-fitted photographic film unit, the sector spring of which is a electronic flash trigger switch.

The first object of the present invention can be also accomplished by a lens-fitted photographic film unit in which the electronic flash trigger switch is electrically connected with a printed board on which a electronic flash circuit is formed.

The first object of the present invention can be also accomplished by a lens-fitted photographic film unit in which the electronic flash trigger switch is composed of at least two leaf springs.

The first object of the present invention can be also accomplished by a lens-fitted photographic film unit in which the electronic flash trigger switch is independently fixed to the lens-fitted photographic film unit body.

The second object of the present invention can be accomplished by a lens-fitted photographic film unit in which the electronic flash trigger switch is supported on a printed board by at least two points.

The third object of the present invention can be accomplished by a lens-fitted photographic film unit having a printed board on which a electronic flash circuit is formed with which a electronic flash trigger switch composed of a leaf spring is electrically contacted.

DETAILED DESCRIPTION OF THE PREFERRED EMBODIMENT

Figure 8:
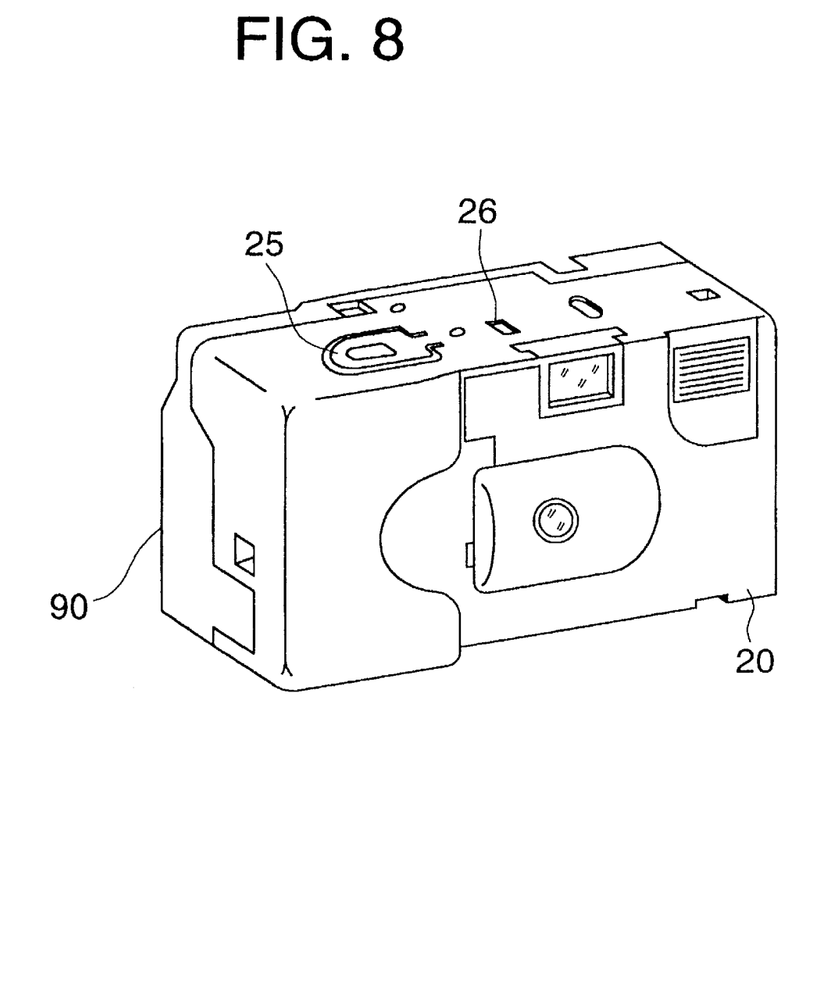
FIG. 8 is a view showing an external appearance of the lens-fitted photographic film unit of the present invention.

FIG. 8 is a view showing an external appearance of the lens-fitted photographic film unit of the present invention.

The external appearance of the lens-fitted photographic film unit of the present invention is the same as that of the conventional one. Like parts in each of the drawings are identified by the same reference character.

The lens-fitted photographic film unit includes a film unit body (not shown in the drawing), a front cover 20 and a rear cover 90. A 35 mm photographic film (J135) is previously charged from the back side of the lens-fitted film body, and after the completion of exposure, the film unit is sent to a laboratory without rewinding the exposed photographic film. In the laboratory, the exposed photographic film is taken out from the unit and developed and printed. The exposed photographic film can be easily taken out from the unit when a portion of the rear cover is bent. After the film unit main body is inspected, a new unexposed film is charged into the unit and a new rear cover is provided to the unit so that the film unit can be used again.

An external appearance of the lens-fitted photographic film unit will be explained below.

An objective lens of the viewfinder is attached to the front of the front cover 20, and the front cover 20 is engaged with a decorative cover so as to be fixed, and further an eyepiece is attached onto the rear side. Further, a lens holding member (not shown) and a electronic flash unit are fixed by the front cover 20 so that they are integrated on the front of the film unit main body.

In a cartridge chamber (not shown) formed on the rear side of the film unit main body, a cartridge (not shown) is provided, and in a scroll chamber (not shown), a spool is provided, with which a leading end of an unexposed film is engaged. Successively, a rear cover 90 is attached to a rear surface of the film unit main body, so that the unexposed film can be shaded and further the film surface can be appropriately set on a focal surface of the photographic lens. After that, the overall film unit is charged in the Carton K on which the brand name and instruction are printed.

Figure 1:
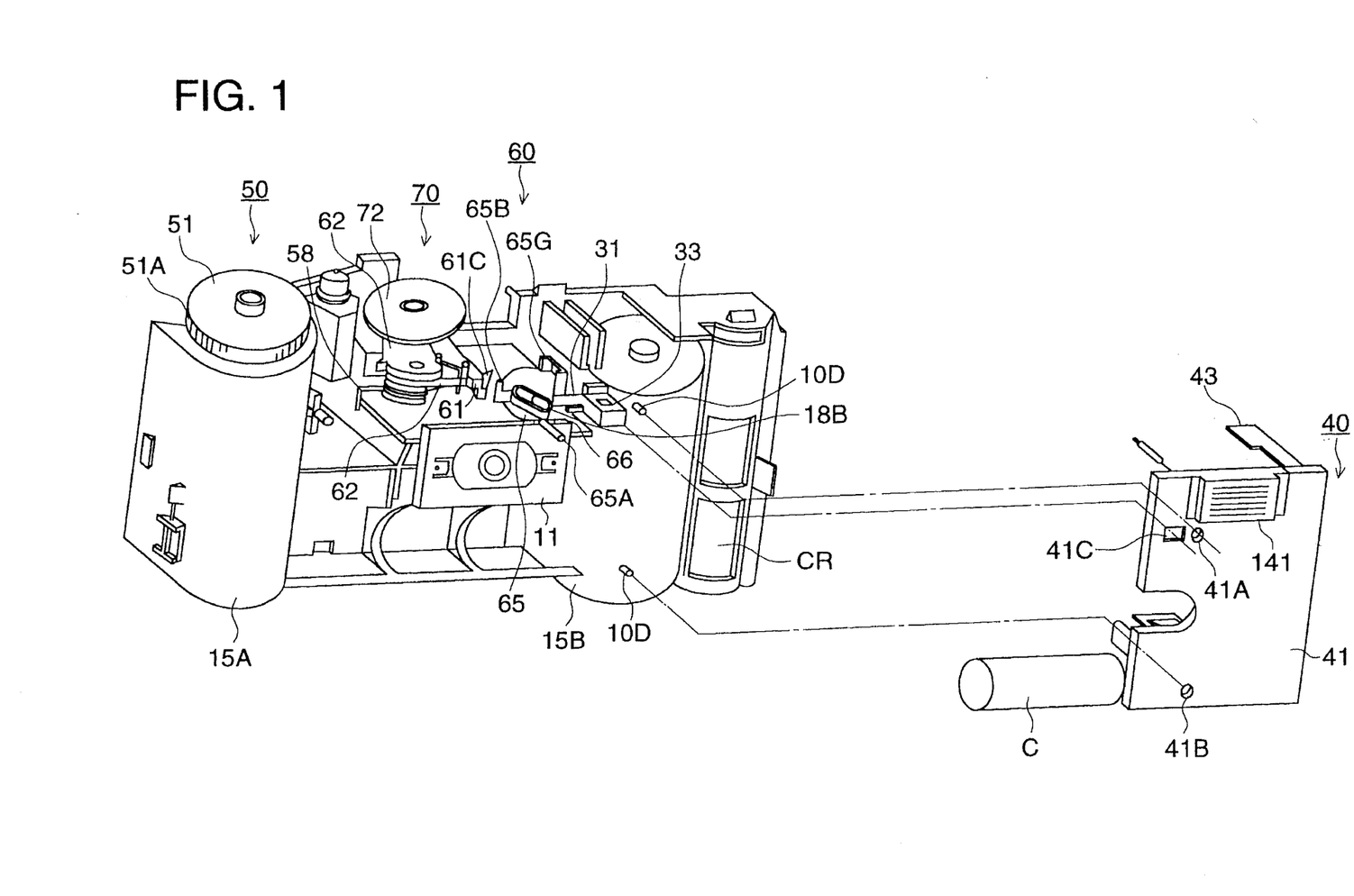
FIG. 1 is a perspective view showing the photographic film unit of the example of the lens-fitted photographic film unit of the present invention.
Figure 2:
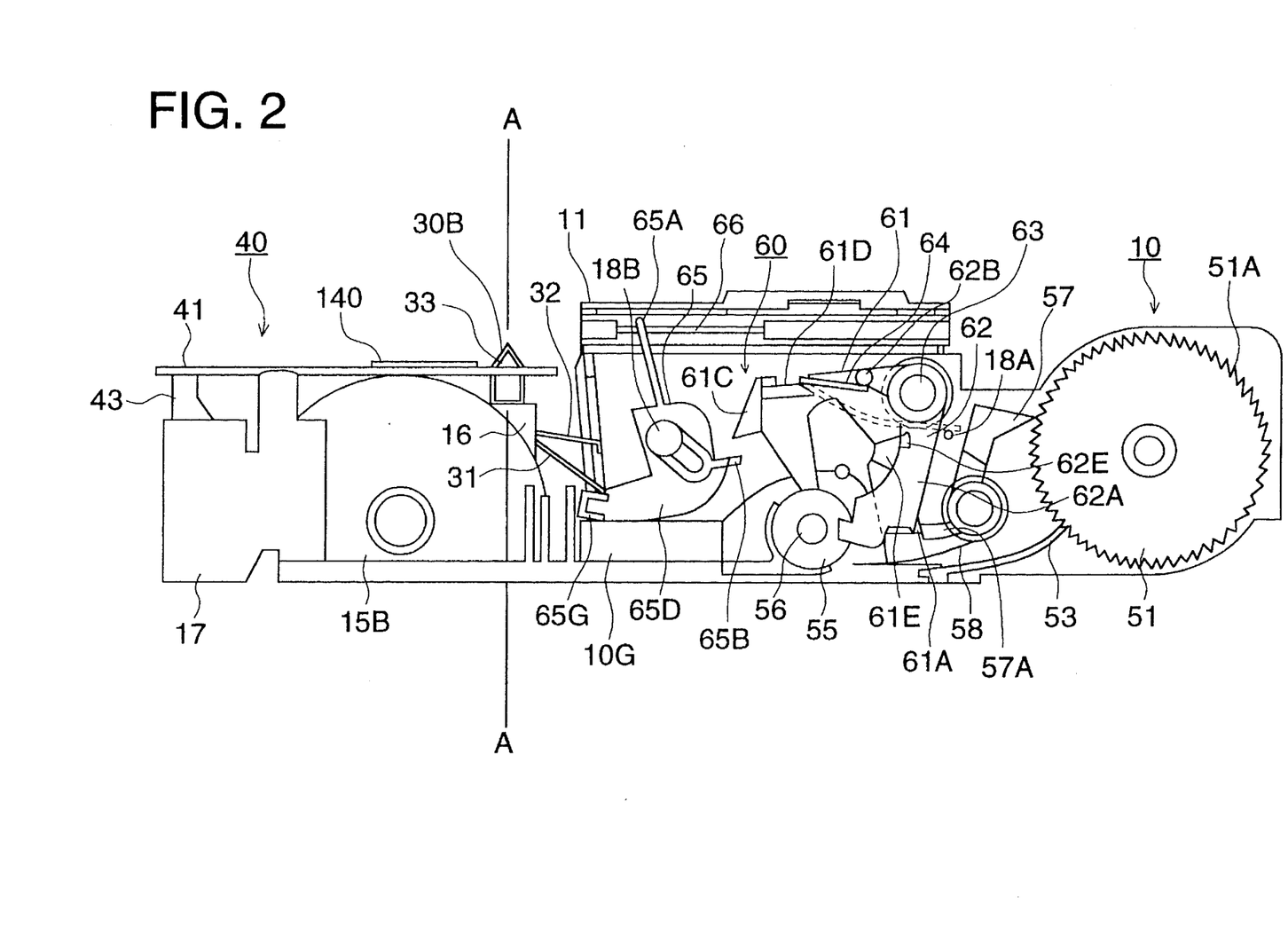
FIG. 2 is a plan view showing the film unit body of the example shown in FIG. 1.

FIG. 1 is a perspective view of the film unit main body of the example of the lens-fitted photographic film unit of the present invention. FIG. 2 is a plan view of the film unit shown in FIG. 2.

A film winding mechanism 50, sector charge mechanism 60, film counter mechanism 70 and sector case 11 are attached to the film unit main body 10.

The sector case 11 is fixed to the film unit main body in such a manner that claws protruding on both sides are engaged with an engaging section provided on the front of the film unit main body 10, and the sector 66 is connected with the sector charge mechanism 60.

In the front of the sector case 11, there is provided a photographic lens which is a single lens, the focal distance of which is f=30 mm. The lens is engaged with a guide pin (not shown) and covered with a lens holding member having a slot.

The film unit body 10, sector case 11, and front and rear covers 20, 90 shown in FIG. 8 are molded from black delustering plastic material.

The electronic flash unit 40 includes a electronic flash light emitting section 140 provided on the printed base board 41 on which the electronic flash circuit is formed. Holes 41A, 41B are formed on the printed base board 41. These holes 41A, 41B are respectively engaged with the guide pins 10D provided on the front surface of the film unit body 10. In this way the electronic flash unit 40 is attached to the film unit body 10. When the printed circuit 41 is connected with a connecting unit 30 described later, electronic flash light emitting operation of the electronic flash unit can be controlled by operating the sector lever 65. The detail of electronic flash light emitting control will be described later. In this example, the number of the guide pins 10D is 2, however, it should be noted that the present invention is not limited to the specific example, and the number of the guide pins 10D may be not less than 3. When the number of the guide pins 10D is increased, of course, the number of holes formed on the printed circuit 41 is increased.

A pair battery contact pieces 43 provided on the printed circuit 41 are protruded in a battery chamber CR formed on the back of the film unit body 10. A SUM-3 dry battery (not shown) is used for the electronic flash power source. A condenser C is accommodated in a condenser chamber provided at a lower position of the sector case 11. In order to attach the connecting unit 30, a penetrating hole 41C, the diameter of which is sufficiently large, is formed. The electronic flash light emitting section 140 includes a discharge tube and a reflector which are fixed to a panel 141 for light diffusion. The slot portions provided on both sides of the panel 141 are press-fitted into a pair of guide pins (not shown) protruding from the front surface of the film unit body 10. In this way, the electronic flash light emitting section 140 is attached to and supported by the film unit body 10.

The connecting unit 30 includes a base body 30A molded from plastic material and a connecting section 30B. A pair of synchronizing contacts 31, 32 composed of leaf springs are embedded in the base body 30A, and electrodes 33 electrically connected with the synchronizing contacts 31, 32 are provided on a surface of the connecting section 30B. As illustrated in FIGS. 1 and 2, the connecting unit 30 is engaged with the insertion hole 16A formed in the attaching section 16 integrally molded on the front wall of the film unit body 10, wherein the front wall composes the scroll chamber 15B. Due to the foregoing, as shown in FIGS. 1 and 2, the synchronizing contacts 31 made of leaf springs are contacted with a pushing section 65G of the sector lever 65. The contact section 30B having the electrodes 33 of the connecting unit 30 is inserted into an insertion hole 41C formed on the printed board 41. Due to the foregoing construction, the connecting unit 30 and the printed board 41 are electrically connected as the inner wall of the insertion hole 41C is composed of the electrodes. In this example, the synchronizing contacts 31, 32 correspond to a electronic flash trigger switch. As described above, the synchronizing contacts 31 composing the trigger switch function as a sector spring.

In this example, the number of the synchronizing contacts 31, 32 is 2, however, it should be noted that the present invention is not limited to the specific example, and the number of the synchronizing contacts 31, 32 may be not less than 3.

The film unit body 10 includes a cartridge chamber 15A and a scroll chamber 15B provided on both sides of the image frame which is an exposure section, wherein these chambers are used for winding and charging a film. In the cartridge chamber 15A, a cartridge (not shown) is charged, and in the scroll chamber 15B, a spool (not shown) is charged for engaging a fore end of an unexposed film. In the back of the film unit body 10, a rear cover 90 (shown in FIG. 8) is provided so that the film can be shaded and positioned on a focal surface of the photographic lens. One end of the film is engaged with the spool in the cartridge. After the film has been charged into the unit, the film in the cartridge is once wound by a spool. Since the other end is engaged with the spool in the cartridge, the film is wound by the action of a film winding mechanism 60 described later each time of photographing operation.

The photographic film is composed in the following manner. A roll film, the thickness of which is 110 to 140 μm, is coated with photosensitive material. Then the film is accommodated in a cartridge, and one end of the film is fixed to a spool of the cartridge in a dark room, and a predetermined length of film, by which a predetermined number of frames can be photographed, is wound around the spool of the cartridge, and a predetermined length of film is pulled out from an outlet of the cartridge. Under the aforementioned condition, the film is charged into the film unit body 10. Specifically, the cartridge is charged into the cartridge chamber 15A so that the spool of the cartridge can be engaged with a fork portion (not shown) for winding. On the other hand, a spool is inserted into the scroll chamber 15B. A fore end of the film notcher is inserted into the slit of the spool, and the perforations of the film are meshed with the claw. After that, the rear cover 90 (shown in FIG. 8) is attached to the unit so that a light-sealed condition can be maintained. Under the above condition, the film unit body 10 is attached to a film winding device, and all the film is wound around a spool in the scroll chamber. In this way, film charging is completed. Since the film is charged in this way, the film is successively wound by the spool in the cartridge each time the photographing operation is completed. After a predetermined number of frames have been photographed, two frames of film are fed without conducting the photographing operation. Then, a necessary length of the film is left out of the cartridge without being wound into the cartridge, and a photographed portion of the film is wound into the cartridge. Consequently, it is not necessary for a user of the film unit to rewind the film after photographing, and all he has to do is to take the film to a laboratory. At the laboratory, when a portion of the rear cover 90 of the lens-fitted photograph film unit is bent, the photographed film can be taken out from the unit, and then the film is developed and printed.

Next, the film winding mechanism 50, sector charge mechanism 60 and film counter mechanism 70 will be explained in detail as follows.

The film winding mechanism 50 includes: a film winding knob 51, ratchet 51A, winding fork (shown in FIG. 9) 52, sprocket (shown in FIG. 9) 54, and cam 55. When the winding knob 51 is rotated counterclockwise, the spool is rotated so that the film can be wound into the cartridge.

The winding knob 51 is provided in such a manner that it protrudes from a left upper wall on the back of the film unit body 10, and a ratchet wheel 51A is provided coaxially with the knob 51. When the knob 51 is wound counterclockwise, the film can be wound. The winding fork 52 protrudes into the cartridge chamber 15A and engages with the spool of the cartridge to be charged. In the sprocket wheel 54, 8 teeth are provided and ends of the teeth are exposed onto the rail surface 17. The sprocket wheel having 8 teeth are meshed with the perforations of the film. In a portion on the outer circumference of the cam 55, a groove 55A is formed, with which a protruding portion 62D of the cam stopper 62 is engaged. A stepwise cam 55 having a sector cam 55B, the profile of which is the same as the outer circumference of the cam 55, is provided at a lower position on the opposite side of the groove 55A. A cam shaft 56 is inserted into the stepwise cam 55 in the vertical direction, so that the cam 55 can be rotated. An upper end of the cam shaft 56 is engaged with an indicator gear 72 of the film counter mechanism 70 having V-grooves 72B.

As explained above, the film winding mechanism 50 is operated in the following manner. When the winding knob 51 is rotated counterclockwise, the spool is rotated so that the film can be wound into the cartridge. At this time, the film drives the cam 55 counterclockwise through the sprocket wheel 54 meshed with the perforations of the film. In other words, the film is wound by one frame, the length of which is the same as the length of 8 perforations, wherein 8 is the number of the teeth of the sprocket wheel 54.

The sector charge mechanism includes: a charge lever 61, cam stopper 62, charge lever shaft 63, charge lever spring 64, sector lever 65, and sector 66. By the action of the sector 66, the sector charge mechanism 60 can be maintained at a light-sealed position, and after the release operation has been conducted, the swung sector 66 is returned to the light-sealed position.

The charge lever 61 is rotatably engaged with the charge lever shaft 63. A charge lever spring 64 is provided between a pin 18A attached to the film unit body 10 and a cutout portion 61D of the charge lever 61, so that the charge lever 61 can be pushed counterclockwise by the charge lever spring 64.

A cam stopper 62 is rotatably engaged with a charge lever shaft 63. A fore end horizontal section of the charge lever spring 64 is activated between the cutout portion 61D of the charge lever 61 and the stopper pin 62B implanted in the cam stopper 62. Therefore, the cam stopper 62 is pushed by the charge lever spring 64 so as to be rotated clockwise with respect to the charge lever 61.

A protruding section 61E is provided in an arm 61A of the charge lever 61, and another protruding section 62E is provided in an arm 62A of the cam stopper 62. When the cam stopper 62 pushes the charge lever 61 clockwise, the protruding portion 61E of the charge lever 61 comes into contact with another protruding portion 62E of the cam stopper 62, so that they are integrally engaged with the lever shaft 63.

Consequently, as the charge lever 61 is pushed counterclockwise by the charge lever spring 64, the integrated charge lever 61 and cam stopper 62 are pushed counterclockwise. Operations of the charge lever 61 and the cam stopper 62 after the completion of photographing are explained above. In this way, the sector 66 can be put in a light-sealed condition.

Next, movement of the sector charge mechanism 60 to the charge completion position will be explained as follows.

The sector 66 is pivotally supported by the sector pin 18D (shown in FIG. 9) implanted in the film unit body 10. When the sector lever 65 is operated, the sector 66 is moved, so that an image formed by the photographic lens is exposed to light. The sector drive pin 65A is implanted in the sector lever 65 and inserted into the fork portion of the sector 66. The pin 18B is attached to the film unit body 10 so that the pin 18B can be slidably guided in the long hole formed in the sector lever 65. The sector lever 65 includes a rising portion 65B and an arm plate 65D, and the sector lever 65 is pushed by the synchronizing contact 31 of the leaf spring so that the the left portion of the long hole of the sector lever 65 can be contacted with the pin 18B and also so that the arm plate 65D can be contacted with the side wall 10G provided in the film unit body 10. The sector lever 65 is regulated in the vertical direction by a holding plate provided in the sector case attached to the film unit body 10 on the front surface side, so that the sector lever 65 can not be disconnected by the action of the pin 18B.

A triangular kick member 61C is provided at a position close to an intermediate portion of the arm 61B of the charge lever 61. When the charge lever 61 is rotated clockwise, the rising portion 65B of the sector lever 65 pushes the kick member 61C. Due to the foregoing, the sector lever 65 is guided by the pin 18B engaged with the long hole of the sector lever 65, so that the sector lever 65 is moved onto the sector 66 side, resisting a pushing force of the synchronizing contact 31 of the leaf spring. In this movement of the sector lever 65, the drive pin 65A of the sector lever 65 moves in the fork portion of the sector 66 without moving the sector 66 from its closed position. When the charge lever 61 is rotated clockwise, the kick member 61C of the charge lever 61 is released from the rising portion 65B of the sector lever 65. Then the left end of the long hole of the sector lever 65 comes into contact with the pin 18B by the spring force. Therefore, the arm plate 65D of the sector lever 65 is returned until it comes into contact with the side wall 10G. In this way, the sector charge mechanism 60 completes the charging operation.

The synchronizing contact 31 of the leaf spring not only returns the sector lever 65 but also rotates the sector lever 65 around the pin 18B counterclockwise at all times. Since the sector lever 65 is rotated counterclockwise at all times, the exposure time is determined by the sector 66 in relation to the charge lever spring 64 (shown in FIG. 9) which is stronger than the synchronizing contact 31. At the same time, even when the sector lever 65 is moved along the long hole formed in the sector lever 65, the sector drive pin 65A of the sector lever 65 always maintain the sector 66 in a closed condition.

Due to the foregoing construction, it is possible to provide the connecting unit 30 having the synchronizing contact 31 capable of being used as a sector spring, too. Further, it is possible to omit the spring 67 exclusively used for returning the sector spring, the spring 67 being illustrated in FIG. 9.

When the winding operation has been completed, a v-shaped protrusion provided at the end of the stopper 57 is meshed with a tooth groove of the ratchet wheel 51A provided on the outer circumferential surface of the winding knob 51 by a spring force of the winding stopper spring 58 which pushes the stopper 57 clockwise. In this way, the counterclockwise rotation of the winding knob 51 can be prevented. A fore end of the backstop claw 53 made of resilient plastics attached to the film unit body 10 comes into pressure contact with the tooth groove 51A of the ratchet wheel 51A of the winding knob 51. Therefore, the winding knob 51 can not be rotated clockwise. In other words, the winding knob 51 can not be rotated in a direction opposite to the film winding direction. In this way, the film winding mechanism 50 is not activated.

Next, the exposure conducted on the photographic film will be explained below.

Under the condition of completion of photographing, as illustrated in FIG. 8, when the release button 25 on the front cover 20 is pressed, a release button pin (not shown) coming into contact with a back side of the release button 25 is activated. Due to the foregoing, the winding knob 51 is operated as illustrated in FIG. 1, and the winding stopper 57 is rotated counterclockwise resisting a spring force of the winding stopper spring 58. Therefore, an edge of the arm 61A of the charge lever 61 is disconnected from the end surface of the arm 57A of the winding stopper 57. At this time, the cam stopper 62 is rotated counterclockwise by a spring force of the charge lever spring 64.

When the charge lever 61 is rotated counterclockwise by a spring force of the charge lever spring 64 which is stronger than synchronizing contact 31, the triangular kick member 61C attached to the charge lever 61 hits the rising portion 65B of the sector lever 65, so that the rising portion 65B is disengaged from the kick member 61C. Due to the foregoing, the sector lever 65 is rotated clockwise around the pin 18B in the long hole, resisting a pushing force of the synchronizing contact 31. Accordingly, a pushing portion 65G provided at a fore end of the arm plate 65D of the sector lever 65 pushes, resisting a pushing force of the synchronizing contact 31 composed of a pair of leaf spring. Due to the foregoing motion, the synchronizing contacts 31 and 32 are contacted with each other. When the synchronizing contacts 31 and 32 are contacted in the manner described above, electric power is supplied from a condenser C to the electronic flash light emitting section 140, so that electronic flash light is emitted. Successively, the sector lever 65 is returned to its initial position by a pushing force of the synchronizing contacts 31 composed of a pair of leaf springs. Consequently, the sector drive pin 65A rotates the sector 66 around the sector pin 18D so as to expose the photographic film, and then the sector 66 is closed. This example is to provide a printed base board 41 on which the electronic flash circuit is formed, and the printed base boars 41 can be attached to and detached from the connecting unit 30 corresponding to the electronic flash trigger switch.

Next, the film counter mechanism will be explained as follows.

On an upper surface of the number indicating gear 72, a number indicating disk (not shown) is printed in the form of an integrally molded body. The number indicating gear 72 is meshed with a V-shaped groove 56A provided an upper end of the cam shaft 56 implanted in the cam 55 rotated integrally with the sprocket wheel 54. Each time the film is wound by one frame and the cam shaft 56 is rotated by one revolution, the number indicating gear 72 is rotated clockwise by one tooth. In this way, the number of frames to be photographed is displayed in a film counter window 26 provided on an upper surface of the front cover 20.

A projection 72A is provided on a lower surface of the number indicating gear 72. Each time one frame of the photographic film is photographed, the film is wound, and at this time the projection 72A enters between one projection 61E of the charge lever 61 and another projection 62E of the cam stopper 62. After the projection 72A has entered between both projections 61E and 62E, even when the film is wound up by one frame and the cam 55 is rotated by one revolution so that the sector is charged, both projections 61E and 62E are blocked by the projection 72A of the number indicating gear 72, and accordingly the charge lever 61 can not be operated, and further the protruding portion 62D of the cam stopper 62 can not be meshed with the groove 55A of the cam 55. In this case, the arm 57A of the winding stopper 57 is contacted with an end surface of the arm 62A of the cam stopper 62 by a spring force of the winding stopper spring 58. The V-shaped protruding portion of the end of the winding stopper 57 is not engaged with the ratchet wheel 51A, and the charge lever 61 is not operated so that the sector can not be opened and closed. Therefore, the photographic film can not be exposed to light.

When two frames of film are wound up, the number indicating gear 72 is rotated by an angle corresponding to two teeth. Even after the rotation of the number indicating gear 72, the projection 72A of the number indicating gear 72 continues to hold the projection 61E, so that the charge lever 61 is blocked, however, the projection 72A is disconnected from the protrusion 62E of the cam stopper 62. The protruding portion 62D is meshed with the groove 55A of the cam 55, and the winding stopper 57 is released, so that the winding knob 51 is engaged with the winding stopper 57. Therefore, it becomes impossible to wind the photographic film. As the charge lever 61 is blocked, the photographic film can not be exposed. In this way, an end of the photographic film is prevented from being wound into the cartridge.

Due to the foregoing construction of this example, it is possible to provide a lens-fitted photographic film characterized in that: the sector spring used for returning the sector lever 65 is unified; and the sector is stably operated so that substantially same shutter speed can be obtained irrespective of the existence of the printed board for emitting electronic flash light.

The following are explanations of another embodiment of the connecting unit and the sector spring. Like parts in each of FIGS. 1, 2, 3, 4, 5 and 6 are identified by the same reference character and the explanations will be omitted here.

FIGS. 3 through 6 are sectional views of another connecting unit taken on line A—A in FIG. 2.

Figure 3:
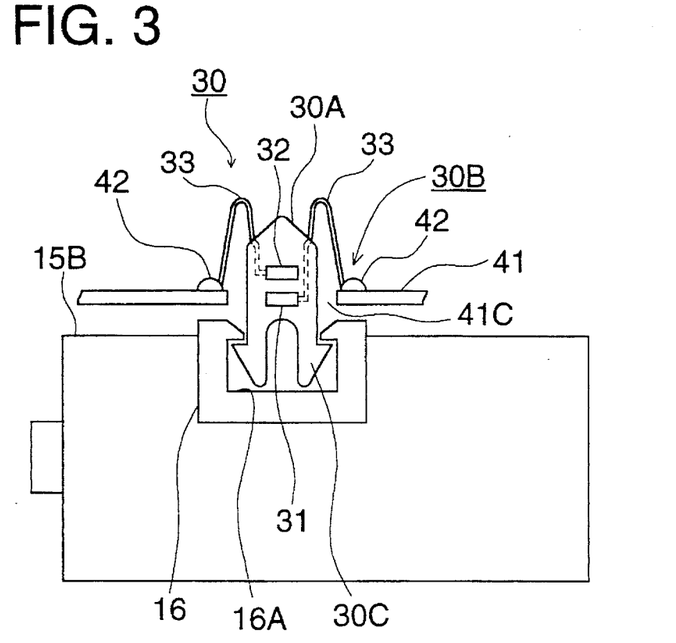
FIG. 3 is a sectional view of the connection unit showing the second example.

FIG. 3 is a sectional view of the connecting unit of the second example.

In the same manner as described before, the connecting unit 30 includes a base body 30A molded from plastic material and a connecting section 30B. A pair of synchronizing contacts 31, 32 composed of leaf springs are embedded in the base body 30A, and electrodes 33 electrically connected with the synchronizing contacts 31, 32 are protruded from a surface of the base body section 30A. Although not shown in the drawings, the synchronizing contact 31 functions as a sector spring in the same manner as explained in FIGS. 1 and 2. In this example, the number of the synchronizing contacts 31, 32 is 2, however, it should be noted that the present invention is not limited to the specific example, and the number of the synchronizing contacts 31, 32 may be not less than 3.

As illustrated in the drawings, two engaging sections are formed in the connecting section 30C. The connecting section 30C is engaged with an attaching section 16 of the film unit body 10 by these two engaging sections.

Next, a method will be explained, by which the printed board 41 having a electronic flash light emitting circuit is attached to the film unit body.

First, the attachment of the printed board 41 to the film unit body 10 will be explained. The attaching section 16 is integrally molded on the front wall of the scroll chamber 15B composing the film unit body 10. As illustrated in FIG. 3, an insertion hole 16A is formed in the attaching section 16. When the connecting section 30C of the connecting unit 30 is inserted into the insertion hole 16A, the synchronizing contact 31, which is a leaf spring, comes into contact with the pushing section 65G of the lever 65. Accordingly, in the case of a lens-fitted photographic film unit having no electronic flash unit 40, the front cover is attached under the condition described above.

However, in the case of a lens-fitted photographic film unit having a electronic flash unit 40, it is necessary to attach the printed board 41 on which a electronic flash light emitting circuit is provided. An insertion hole 41C is formed on the printed board 41 in the form of a through-hole. A swell of solder 42 is provided at a position close to the insertion hole 41C on the printed board 41, wherein this swell of solder 42 is connected with the circuit printed on the base board. The base body section 30A of the connecting unit 30 is inserted into the insertion hole 41C formed on the printed baseboard 41. Due to the foregoing construction, the electrode 33 is contacted with the swell of solder 42, so that the connecting unit 30 is electrically connected with the printed board 41. According to this example, it is possible to provide a printed board 41 corresponding to a electronic flash light emitting trigger switch, on which the electronic flash light emitting circuit is formed, the printed board 41 capable of being attached to and detached from the connecting unit 30.

When the above construction is adopted, it is possible to provide the connecting unit 30 having the synchronizing contact 31 which can be also used as a sector spring. In addition to that, the spring 67 shown in FIG. 9 exclusively used for returning the sector can be eliminated.

Figure 4:
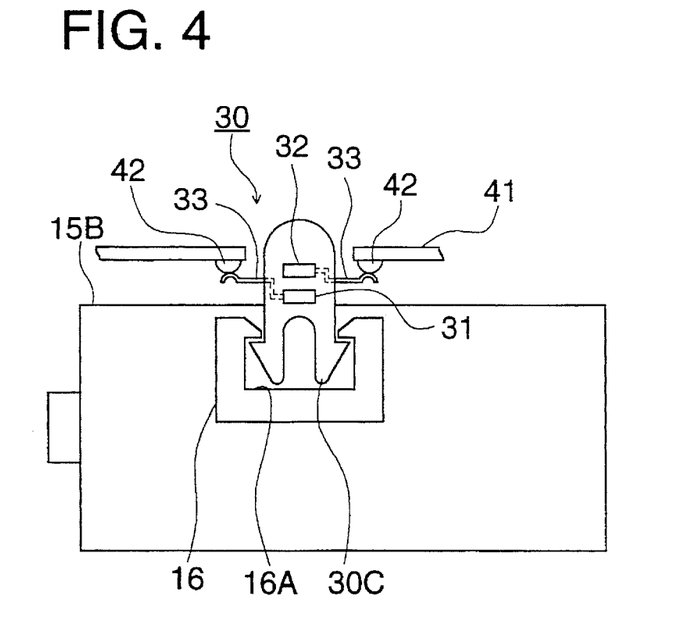
FIG. 4 is a sectional view of the connection unit showing the third example.

FIG. 4 is a sectional view of the connecting unit which is the third example of the present invention.

The construction and function of the connecting unit 30 shown in Fig. 4 are approximately the same as those of the connecting unit 30 shown in FIG. 3 except for the shape of electrodes 33. Therefore, the detailed explanations are omitted here.

Next, a method will be explained, by which the printed board 41 having a electronic flash light emitting circuit is attached to the film unit body.

First, the attachment of the printed board 41 to the film unit body 10 will be explained. The attaching section 16 is integrally molded on the front wall of the scroll chamber 15B composing the film unit body 10. Other points are the same as described before, so that the explanations will be omitted here. When the connecting section 30C of the connecting unit 30 is inserted into the insertion hole 16A, the synchronizing contact 31, which is a leaf spring, comes into contact with the pushing section 65G of the lever 65.

In the case of a lens-fitted photographic film unit having a electronic flash unit 40, it is necessary to attach the printed board 41 on which a electronic flash light emitting circuit is provided. An insertion hole 41C is formed on the printed board 41 in the form of a through-hole. A swell of solder 42 is provided at a position close to the insertion hole 41C on the back side of the printed board 41, wherein this swell of solder 42 is connected with the circuit printed on the base board. The base body section 30A of the connecting unit 30 is inserted into the insertion hole 41C formed on the printed baseboard 41. Due to the foregoing construction, the electrode 33 is contacted with the swell of solder 42, so that the connecting unit 30 is electrically connected with the printed board 41.

Figure 5:
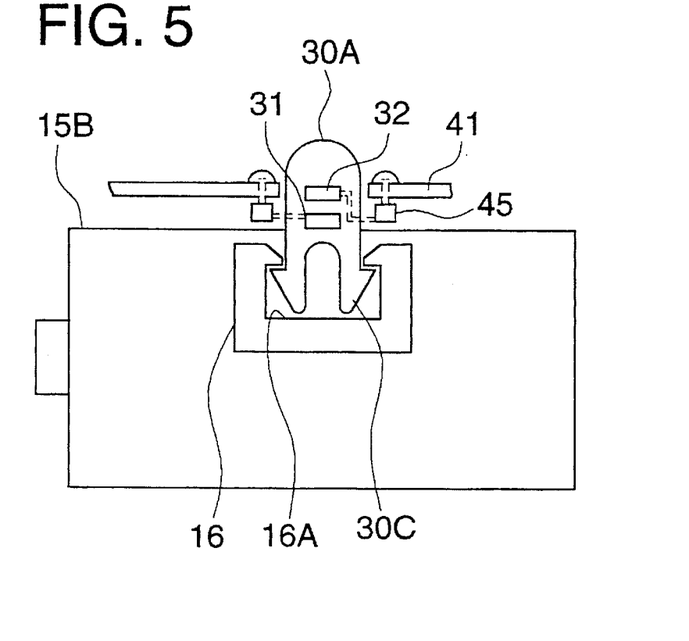
FIG. 5 is a sectional view of the connection unit showing the fourth example.

FIG. 5 is a sectional view of the connecting unit which is the fourth example of the present invention.

The construction and function of the connecting unit 30 shown in FIG. 5 are approximately the same as those of the connecting unit 30 shown in FIG. 4. In this case, the electrode 33 is connected with the synchronizing contacts 31, 32 by an electrically conductive metal.

Next, a method will be explained, by which the printed board 41 having a electronic flash light emitting circuit is attached to the film unit body.

First, the attachment of the printed board 41 to the film unit body 10 will be explained. The attaching section 16 is integrally molded on the front wall of the scroll chamber 15B composing the film unit body 10. Other points are the same as described before, so that the explanations will be omitted here. When the connecting section 30C of the connecting unit 30 is inserted into the insertion hole 16A, the synchronizing contact 31, which is a leaf spring, comes into contact with the pushing section 65G of the lever 65.

In the case of a lens-fitted photographic film unit having a electronic flash unit 40, it is necessary to attach the printed board 41 on which a electronic flash light emitting circuit is provided. An insertion hole 41C is formed on the printed board 41 in the form of a through-hole. A jumper line 45 is provided at a position close to the insertion hole 41C on the back side of the printed board 41, wherein this jumper line 45 is connected with the circuit printed on the base board. The base body section 30A of the connecting unit 30 is inserted into the insertion hole 41C formed on the printed baseboard 41. Due to the foregoing construction, the electrode 33 is contacted with the jumper line 45, so that the connecting unit 30 is electrically connected with the printed board 41.

When the above construction is adopted, it is possible to provide the connecting unit 30 having the synchronizing contact 31 which can be also used as a sector spring. In addition to that, the spring 67 shown in FIG. 9 exclusively used for returning the sector can be eliminated.

Figure 6:
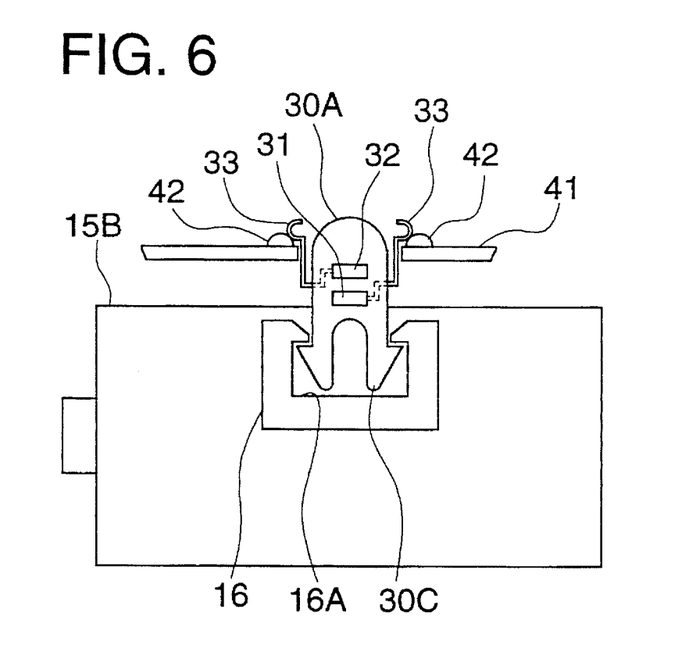
FIG. 6 is a sectional view of the connection unit showing the fifth example.

FIG. 6 is a sectional view of the connecting unit which is the fifth example of the present invention.

The construction and function of the connecting unit 30 shown in FIG. 6 are approximately the same as those of the connecting unit 30 shown in FIG. 4. Therefore, the detailed explanations will be omitted here.

Next, a method will be explained, by which the printed board 41 having a electronic flash light emitting circuit is attached to the film unit body.

First, the attachment of the printed board 41 to the film unit body 10 will be explained. The attaching section 16 is integrally molded on the front wall of the scroll chamber 15B composing the film unit body 10. As illustrated in FIG. 3, an insertion hole 16A is formed in the attaching section 16.

When the connecting section 30C of the connecting unit 30 is inserted into the insertion hole 16A, the synchronous electronic flash light contact piece 31, which is a leaf spring, comes into contact with the pushing section 65G of the lever 65. Accordingly, in the case of a lens-fitted photographic film unit having no electronic flash unit 40, the front cover is attached under the condition described above.

However, in the case of a lens-fitted photographic film unit having a electronic flash unit 40, it is necessary to attach the printed board 41 on which a electronic flash light emitting circuit is provided. An insertion hole 41C is formed on the printed board 41 in the form of a through-hole. A swell of solder 42 is provided at a position close to the insertion hole 41C on the printed board 41, wherein this swell of solder 42 is connected with the circuit printed on the base board. The base body section 30A of the connecting unit 30 is inserted into the insertion hole 41C formed on the printed baseboard 41. Due to the foregoing construction, the electrode 33 is contacted with the swell of solder 42, so that the connecting unit 30 is electrically connected with the printed board 41.

Figure 7:
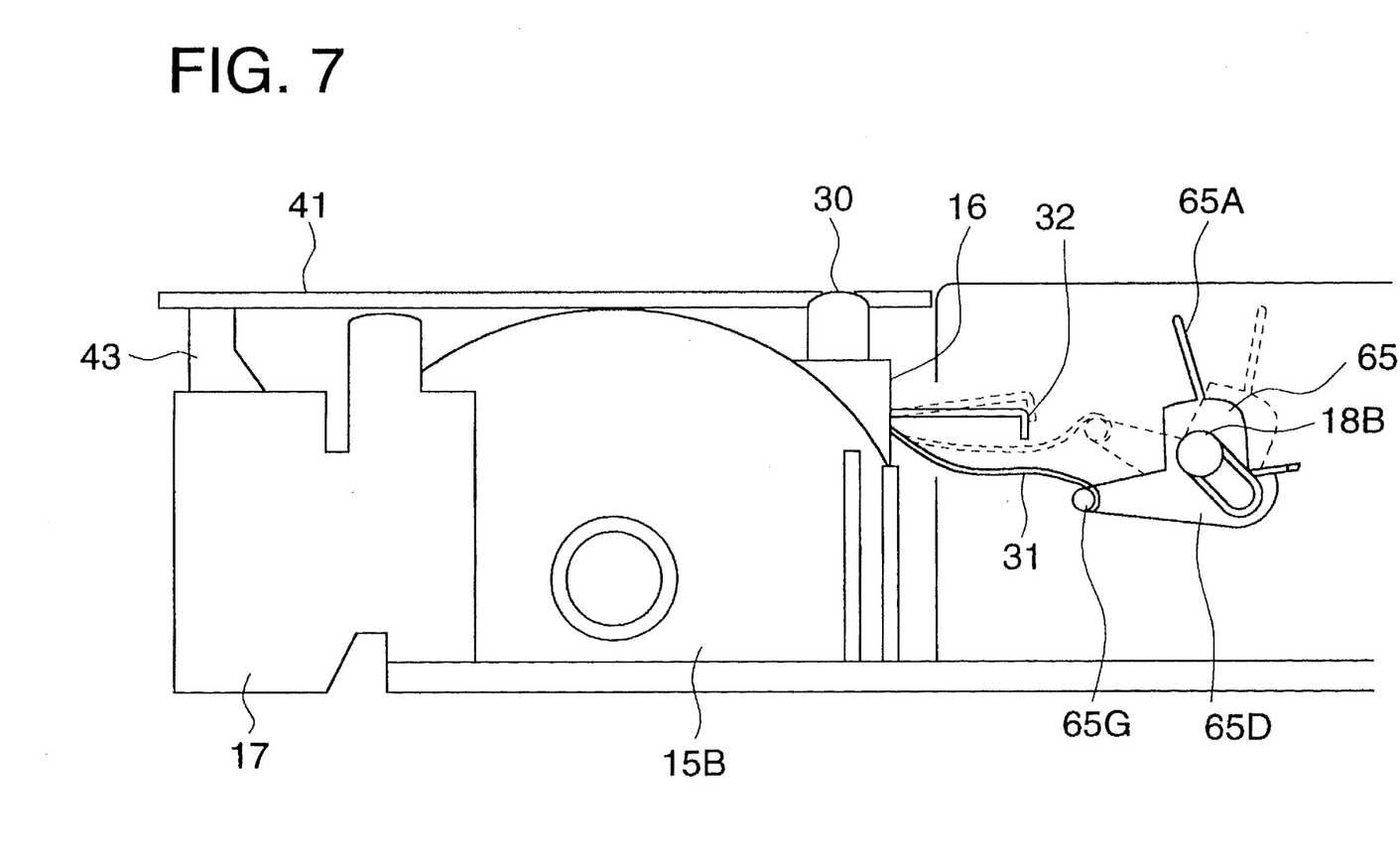
FIG. 7 is a plan view showing the sector spring of the second example.

FIG. 7 is a plan view showing the sector spring in the second example.

In the same manner as described before, the connecting unit 30 includes a base body 30A molded from plastic material and a connecting section 30C. A pair of synchronizing contact 31, 32 composed of leaf springs are embedded in the base body (not shown), and electrodes (not shown) electrically connected with the synchronizing contacts 31, 32 are protruded from a surface of the base body section 30A. In this drawing, an engaging portion of the connecting section (not shown) 30C is engaged with the attaching section 16, and further the base body section is inserted into the insertion hole 41C of the printed base board 41. In this way, the synchronizing contacts 31, 32 and the printed base board 41 are attached to the film unit body 10. As illustrated in FIG. 7, the synchronizing contact 31 is curved, so that a pushing portion 65G formed at an end of the arm of the sector lever 65D is pushed by the contact piece 31 at all times. Due to the foregoing construction, the sector lever 65 is rotated clockwise around the pin 18B, and the sector lever 65 is returned.

According to the first to fifth constructions of the present invention, in the lens-fitted photographic film unit, springs activated for returning the sector can be unified, and a constant shutter speed can be stably provided irrespective of the existence of the printed base board used for emitting electronic flash light.

According to the sixth construction of the present invention, a electronic flash light trigger switch capable of being used as a sector spring can be provided. Therefore, a spring exclusively used for returning the sector can be eliminated.

According to the seventh construction of the present invention, it is possible to provide a printed base board having a electronic flash light emitting circuit capable of being attached to and detached from the electronic flash light emitting trigger switch, and the printed base board can be easily attached to the main body compared with a coil spring.

What is claimed is:

1. A lens-fitted photographic film unit having an unexposed photographic film loaded therein, the film unit comprising:

(a) a main body, wherein the unexposed photographic film is loaded therein and an electronic flash unit including an electronic flash circuit is attachable on the main body;

(b) a sector provided on the main body for exposing the unexposed photographic film by opening and closing movements of the sector responsive to a release operation; and (c) a connecting unit provided on the main body having a first and a second elastic, electrically conductive member disposed facing each other in a spaced apart relation with each other, each member including a first tip end and a second tip end opposite the first tip end, wherein the second tip ends of the first and second conductive members acting as synchronizing contacts for flashing the electronic flash unit, each of the first tip ends being electrically in contact with the electronic flash circuit when the electronic flash unit is attached to the main body, and when the release operation of the film unit is conducted, the second tip end of the first member is forced to bend in accordance with the opening movement of the sector to come in contact with the second tip end of the second member, and the second tip end of the first member acts on the sector so that the sector returns to a closed position thereof by an elastic restoring force of the first member after the first member contacts the second member.

2. The lens-fitted photographic film unit of claim 1, wherein the first and second members comprise leaf springs.

\* \* \* \* \*